US010719568B2

(12) United States Patent
Johnson, Jr. et al.

(10) Patent No.: US 10,719,568 B2
(45) Date of Patent: Jul. 21, 2020

(54) FIXING EMBEDDED RICHTEXT LINKS IN COPIED RELATED ASSETS

(71) Applicant: International Business Machines Corporation, Armonk, NY (US)

(72) Inventors: Morris S. Johnson, Jr., Cary, NC (US); Allison Lynch, Arlington, MA (US); Ian Compton, South Queensferry (GB); David M. Chadwick, Topsail Beach, NC (US); Jarett D. Stein, Bryn Mawr, PA (US)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 15/824,524

(22) Filed: Nov. 28, 2017

(65) Prior Publication Data

US 2019/0163834 A1    May 30, 2019

(51) Int. Cl.
*G06F 16/955*    (2019.01)
*G06F 16/84*    (2019.01)
(Continued)

(52) U.S. Cl.
CPC ........ *G06F 16/9558* (2019.01); *G06F 16/214* (2019.01); *G06F 16/2365* (2019.01); *G06F 16/86* (2019.01); *G06F 16/958* (2019.01)

(58) Field of Classification Search
IPC ..................... G06F 17/30882,17/303, 17/30371
See application file for complete search history.

(56) References Cited

U.S. PATENT DOCUMENTS 5,745,360 A     4/1998   Leone
5,893,916 A *   4/1999   Dooley ............... G06F 17/2264
                                                            715/234

(Continued)

FOREIGN PATENT DOCUMENTS

WO    PCT-9918519 A1    4/1999
WO    PCT-9953669 A1    10/1999

OTHER PUBLICATIONS

"Impact of server rename on integrated products", downloaded from the Internet Jul. 21, 2017, <https://www.ibm.com/support/knowledgecenter/SSYMRC_4.0.4/com.ibm.jazz.install.doc/topics/c_server_rename_nonclm.html>, 2 pages.

(Continued)

*Primary Examiner* — Scott T Baderman
*Assistant Examiner* — Steve P Golden
(74) *Attorney, Agent, or Firm* — Stephen R. Yoder; David B. Woycechowsky

(57) ABSTRACT

Machine logic for: receiving data set (for example, a website) that includes a plurality of links, with the links respectively identifying logical locations of data stored on a set of server computer(s); and making a deep copy of the servable data set on the set of server computer(s), with the deep copying including: copying each link of the plurality of links of the servable data set from a respective source logical location to a respective target location, and adding each copied link of the plurality of links as a record in a mapping table. The mapping table can help to automatically update/replace links wherever they are found in related system artifacts. If the resolution can't be automatically determined then the system suggests possible target links for manual inspection/updates based on the likelihood of correctness, artifact types, and user roles.

15 Claims, 9 Drawing Sheets

(51) Int. Cl.
*G06F 16/21* (2019.01)
*G06F 16/23* (2019.01)
*G06F 16/958* (2019.01)

(56) References Cited

U.S. PATENT DOCUMENTS

| | | | |
|---|---|---|---|
| 6,151,624 A | 11/2000 | Teare | |
| 6,578,078 B1 | 6/2003 | Smith | |
| 6,775,672 B2* | 8/2004 | Mahalingam | G06F 17/30079 |
| 6,795,434 B1 | 9/2004 | Kumar | |
| 7,290,205 B2 | 10/2007 | Moncsko | |
| 7,302,635 B2 | 11/2007 | Bates | |
| 7,689,667 B2 | 3/2010 | Lal | |
| 8,131,776 B2 | 3/2012 | Cicman | |
| 8,667,031 B2 | 3/2014 | Konduri | |
| 8,750,131 B2 | 6/2014 | Lewin-Eytan | |
| 2003/0226103 A1* | 12/2003 | Hayer | G06F 17/30884 715/205 |
| 2005/0251500 A1* | 11/2005 | Vahalia | G06F 17/30171 |
| 2006/0294039 A1* | 12/2006 | Mekenkamp | G06F 17/30079 |
| 2007/0063031 A1* | 3/2007 | Silverbrook | B41J 3/445 235/432 |
| 2008/0109619 A1* | 5/2008 | Nakanishi | G06F 11/1469 711/159 |
| 2009/0172154 A1 | 7/2009 | Aviles Sanchez | |
| 2011/0153631 A1 | 6/2011 | Kondasani | |
| 2013/0080130 A1* | 3/2013 | Behr | G06F 8/10 703/6 |
| 2015/0193389 A1 | 7/2015 | Rose | |

OTHER PUBLICATIONS

"Redeploying to a more complex technology", downloaded from the internet on Jul. 21, 2017, <https://www.ibm.com/support/knowledgecenter/SSCP65_3.0.0/com.ibm.jazz.install.doc/topics/c_redeploy.html >, 2 pages.

* cited by examiner

Mapping Table -

| Copied From: | Copied To: |
|---|---|
| J2CMDBManualSetup-<br>http:\\oldserverRQM\path\J2CMDBManualSetup | J2CMDBManualSetup-<br>http:\\newserver\path\J2CMDBManualSetup |
| MDBReleaseNotes-<br>http:\\radical.raleigh.ibm.com\path\MDBReleaseNotes | |
| | |

Mapping Table -

| Copied From: | Copied To: |
|---|---|
| J2CMDBManualSetup-<br>http:\\oldRQMserver\path\J2CMDBManualSetup | J2CMDBManualSetup-<br>http:\\newRQMserver\path\J2CMDBManualSetup |
| MDBReleaseNotes-<br>http:\\radical.raleigh.ibm.com\path\MDBReleaseNotes | MDBReleaseNotes-<br>http:\\w3.connection.ibm.com\path\MDBTechNotes |
| | |

Rich Text from Testplan - PlanABC
:
:
if you see errors in the MDB, do a CLEAN(See list of issues - MDBReleaseNotes) and re-run steps

Fix Preview
http:\\w3.connection.ibm.com\path\MDBTechNotes

Accept  Reject

FIG. 7

| Link Type | Copied From | Copied To | Changed By | Changed By Role | Date Changed | Instances Found | Instances Updated |
|---|---|---|---|---|---|---|---|
| Test Case | http://oldserver.com/rqm/com.ibm.testcase/11 | | | | | | |
| Test Plan | http://oldserver.com/rqm/com.ibm.testplan/102 | | | | | | |
| Requirement | http://oldserver.com/rm/com.ibm.requirement/115 | | | | | | |
| Defect | http://oldserver.com/rtc/com.ibm.defect/1129 | | | | | | |
| Documentation | http://doc.ibm.com/rtc/v1/index.html | | | | | | |
| Library/jar | //server.share.com/test/resources/v1/myjar.jar | | | | | | |
| External file | http://dojo.com/v2library.zip | | | | | | |
| Code snippet | //server.share.com/test/resources/v1/mytest.java | | | | | | |
| Test Script | http://oldserver.com/rqm/com.ibm.tscript/112 | | | | | | |

| Link Type | Copied From | Copied To | Changed By | Changed By Role | Date Changed | Instances Found | Instances Updated |
|---|---|---|---|---|---|---|---|
| Test Case | http://oldserver.com/rqm/com.ibm.testcase/11 | http://newserver.com/rqm/com.ibm.testcase/11 | Allison Smith | Test Lead | 1/10/2016 | 3 | 3 |
| Test Plan | http://oldserver.com/rqm/com.ibm.testplan/102 | | | | | 5 | |
| Requirement | http://oldserver.com/rm/com.ibm.requirement/115 | | | | | 2 | |
| Defect | http://oldserver.com/rtc/com.ibm.defect/1129 | http://newserver.com/rtc/com.ibm.defect/1129 | Joe Jones | Tester | 1/11/2016 | 4 | 1 |
| Documentation | http://doc.ibm.com/rtc/v1/index.html | http://doc.ibm.com/rtc/v2/index.html | Server process | Admin | 1/9/2016 | 2 | 2 |
| Library/jar | //server.share.com/test/resources/v1/myjar.jar | | | | | 2 | |
| External file | http://dojo.com/v2library.zip | | | | | 1 | |
| Code snippet | //server.share.com/test/rresources/v1mytest.java | | | | | 1 | |
| Test Script | http://oldserver.com/rqm/com.ibm.tscript/112 | | | | | 6 | |

| Record Key | Link in Page | Link to Page | Copied From | Copied To |
|---|---|---|---|---|
| 1 | www.vehiclesales.biz/moto<br>402a | www.vehiclesales.biz/purchase<br>400a | Server A | Server B |
| 2 | www.vehiclesales.biz/car<br>404a | www.vehiclesales.biz/purchase<br>400a | Server A | Server B |

FIG. 10

FIXING EMBEDDED RICHTEXT LINKS IN COPIED RELATED ASSETS

BACKGROUND

The present invention relates generally to the field of managing links that link content in one piece of content to items or locations in another piece of content.

US published patent application number 2009/0172154 ("Aviles") discloses as follows: "A method for implementing autonomic detection and repair of broken links in Web environments includes receiving a request for additional Web content in a server in response to a link present in an originating Web content held on a host server; determining the present state of the received link; wherein the server performs in response to the received link: returns the requested additional Web content to a user; returns a Web content not found notification to a user; returns a Web content has moved notification with a valid link; wherein the notifications are digitally signed by the server; wherein in response to the returned notifications, the user's browser sends the notifications to the host server; and wherein in response to the reception of the notifications the host server notifies a content manager of the link state, stores the notification in a database, and repairs the link."

Data mapping is the process of creating data element mappings between multiple different data models. Data mapping is used in various types of data integration tasks, such as: (a) data transformation or data mediation between a data source and a destination, (b) identification of data relationships as part of data lineage analysis, (c) discovery of hidden sensitive data such as the last four digits of a social security number hidden in another user id as part of a data masking or de-identification project, and (d) consolidation of multiple databases into a single data base and identifying redundant columns of data for consolidation or elimination. A business that wants to transmit and receive purchases and invoices to and from other businesses could use data mapping to create data maps from the data stored by the business in a format specific to that business into corresponding standardized format messages for items like purchase orders and invoices.

SUMMARY

According to an aspect of the present invention, there is a method, computer program product and/or system that performs the following operations (not necessarily in the following order): (i) receiving, in connection with a server migration, a deep copy request to make a deep copy, based on a nominal object data set, from a source server to a target server; (ii) responsive to receipt of the deep copy request, making a deep copy based on the nominal object data set, with the making of the deep copy including: (a) copying, from the source server to the target server, deep-copied data including at least the following: (1) the nominal object data set, (2) any richtext piece of content linked by the nominal object data set, and (3) any richtext piece of content linking to the nominal object data set, and (b) adding, to a mapping table data structure, a record corresponding to each link of a plurality of deep-copied links present in the deep-copied data.

BRIEF DESCRIPTION OF THE DRAWINGS

FIG. 5 is a table showing information that is helpful in understanding embodiments of the present invention;

FIG. 6 is a table showing information that is helpful in understanding embodiments of the present invention;

FIG. 7 is a screenshot view showing information that is helpful in understanding embodiments of the present invention;

FIG. 8 is a table showing information that is helpful in understanding embodiments of the present invention;

FIG. 9 is a table showing information that is helpful in understanding embodiments of the present invention; and FIG. 10 is a table showing information that is helpful in understanding embodiments of the present invention.

DETAILED DESCRIPTION

Figure 1:
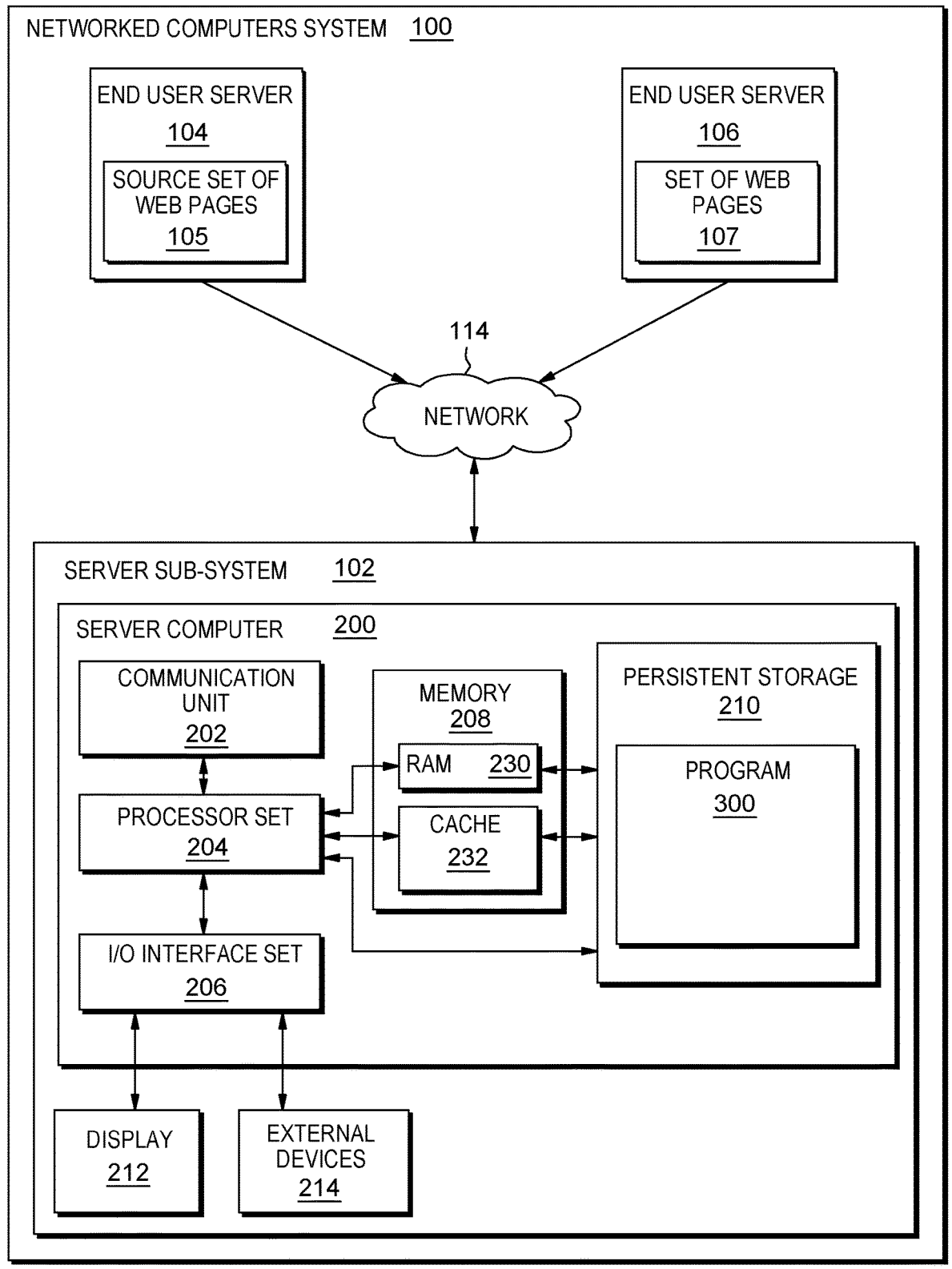
FIG. 1 is a block diagram view of a first embodiment of a system according to the present invention.

Some embodiments are directed to a system that parses richtext areas and places links found into mapping table and then uses the mapping table to automatically update/replace links wherever they are found in related system artifacts. If the resolution can't be automatically determined then system suggests possible target links for manual inspection/updates based on the likelihood of correctness, artifact types, and user roles. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; end user server 104 (including source set of web pages data store 105); end user server 106 (including target set of web pages data store 107); communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
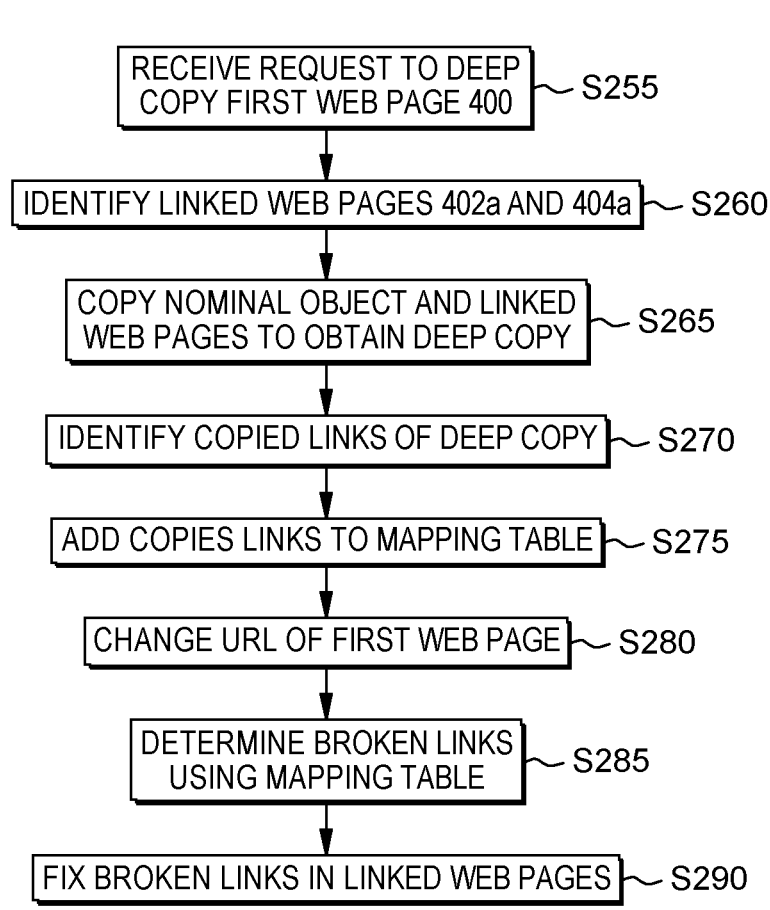
FIG. 2 is a flowchart showing a first embodiment method performed, at least in part, by the first embodiment system.
Figure 3:
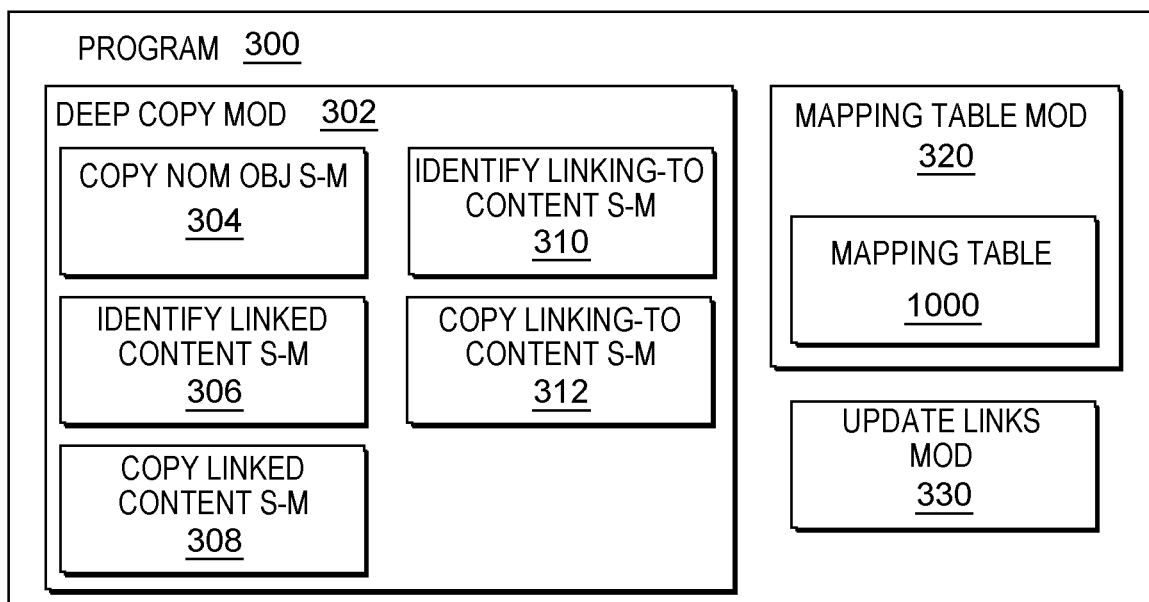
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Figure 4A:
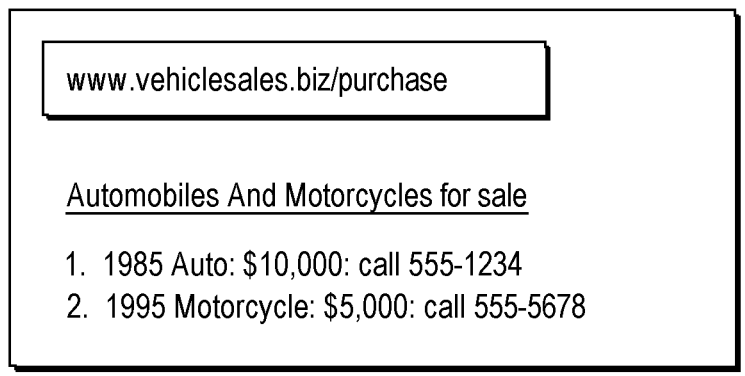
FIG. 4A is a screenshot view generated by the first embodiment system.

Processing begins at operation S255, where deep copy module ("mod") 302 receives a request to perform a "deep copy" operation on a data set corresponding to a piece of richtext content in the form of a first web page that has the URL (uniform resource locator) of www.vehiclesales.biz/purchase (herein referred to as the "first version of first webpage 400a"). FIG. 4A shows a screenshot of a first version of first web page 400a. First version of first webpage 400a is the "nominal object" of the deep copy request in this example. In this example, the deep copy request has been made because it is desired to migrate certain web pages from a source set of web pages 105 on end-user server 104 to a target set of web pages 107 on end-user server.

As used herein, a "deep copy" operation of a data set includes: (i) making a copy of the nominal object piece(s) of richtext content (for example, each web page of a nominal object web site); (ii) identifying all of the piece(s) of content that are linked to in all of the piece(s) of nominal object richtext content (for example, all of the other web pages that the web pages of the web site link to); (iii) making a copy of all of the piece(s) of richtext content identified when performing the previous step in the deep copy operation algorithm; (iv) identifying all of the piece(s) of content that link to all of the piece(s) of nominal object richtext content (for example, all of the other web pages that link to the web pages of the nominal content web site); and (v) making a copy of all of the piece(s) of richtext content identified when performing the previous step in the deep copy operation algorithm. In this example, the deep copy request specifies only a single web page as the nominal object, rather than a web site including multiple web pages.

Processing proceeds to operation S260, where: identify linked content sub-mod 306 identifies richtext piece(s) of content that the nominal object of the deep copy request (that is, first version of first web page 404a) links to; and identify linking-to sub-mod 310 identifies richtext piece(s) of content that link to the nominal object. This corresponds to steps (ii) and (iv) of the deep copy algorithm set forth, above (note: the steps of the deep copy algorithm do not need to be performed in order, as will be seen as this discussion continues). In this example, the nominal object has no links in it (see, screenshot 400a of FIG. 4), and, therefore, sub-mod 306 identifies no linked content.

In this example, the nominal object is linked to by two (2) other web pages. More specifically, the nominal object is linked to by two other web pages as follows: (i) first version of second web page 402a (URL=www.vehiclesales.biz/moto, see FIG. 4C) links to the nominal object; and (ii) first version of third web page 404a (URL=www.vehiclesales.biz/car, see FIG. 4D). Therefore, sub-mod 308 identifies these two pieces of richtext content for inclusion in the deep copy that is being made here.

Processing proceeds to operation S265, where, as part of the server migration mentioned above: (a) copy nominal object sub-mod 304 copies the nominal object (that is, first version of first web page 404) from set of source web pages 105 of end user server 104 to set of target web pages 107 of end user server 106 (this corresponds to step (i) of the deep copy algorithm set forth, above); and (b) copy linking-to content sub-mod 312 copies first version of second web page 402a and first version of third web page 404a from set of source web pages 105 of end user server 104 to set of target web pages 107 of end user server 106 (this corresponds to step (v) of the deep copy algorithm set forth, above). In this example, copy linked content sub-module 308 does nothing during operation S265 because the nominal object links to no other linked content. Alternatively, if the nominal object does link to other linked content piece(s), then, at operation S265, sub-mod 308 would copy that linked content from source 105 to target 107 (corresponding to step (iii) of the deep copy algorithm set forth, above). At this point in the method of flowchart 250, the deep copy of nominal object 400a is complete.

Processing proceeds to operation S270, where mapping table mod 320 identifies each instance of a link in the set of deep copied materials. In this example, the deep copied materials are: (i) first version of first web page 400a (which has no link instances); (ii) first version of second web page 402a (which has one (1) link to the first version of the first web page); and (iii) first version of third web page 404a (which has one (1) link to the first version of the first web page). Therefore, a total of two link instances are identified at operation S270.

Processing proceeds to operation S275, where mapping table mod 320 adds the two links (identified in the previous operation) that were copied during the deep copy (of operations S255 to S265) to mapping table 1000 (see FIG. 3 and FIG. 10). More specifically and as shown in FIG. 10: (i) the link to first version of second web page 402a is added as a first record to mapping table 1000; and (ii) the link to first version of third web page 404a is added as a second record to mapping table 1000. In this example, each of these two records includes values for the following fields: record key; link in page (URL of page where link is located); link to page (URL of page that link links to); server copied from; and server copied to. Alternatively, other embodiments may include somewhat different fields in their mapping tables. This will be further discussed in the next sub-section of this Detailed Description section.

Figure 4B:
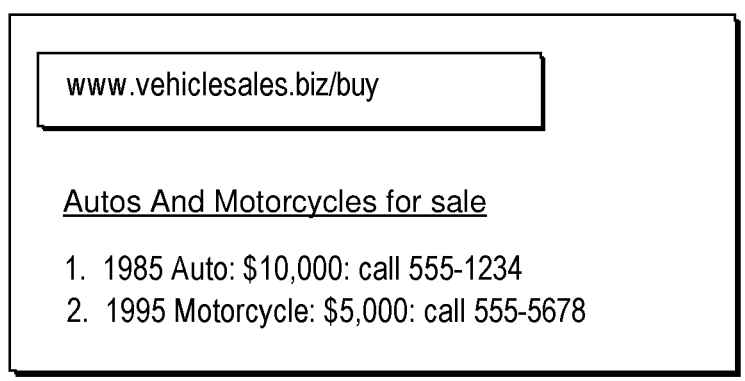
FIG. 4B is a screenshot view generated by the first embodiment system.
Figure 4C:
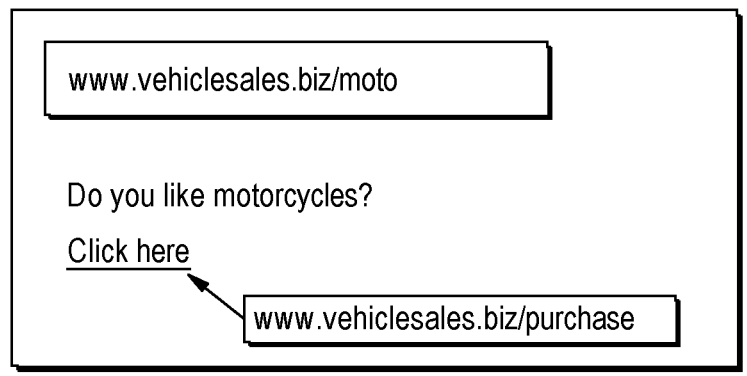
FIG. 4C is a screenshot view generated by the first embodiment system.
Figure 4D:
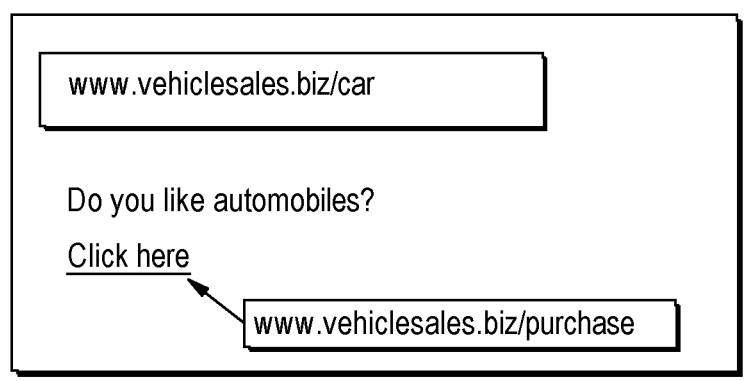
FIG. 4D is a screenshot view generated by the first embodiment system.
Figure 4E:
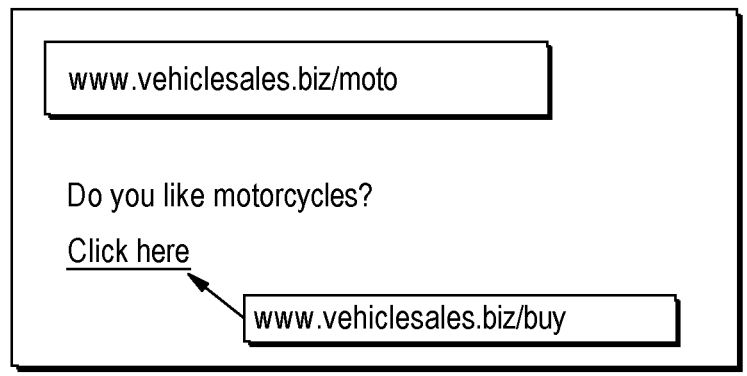
FIG. 4E is a screenshot view generated by the first embodiment system.
Figure 4F:
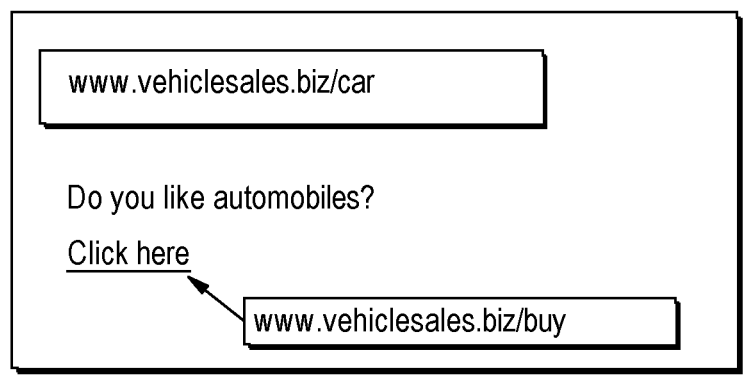
FIG. 4F is a screenshot view generated by the first embodiment system.

Processing proceeds to operation S280, where a URL of the first version of first webpage 400a changes so that first version of first web page 400a becomes second version of first web page 400b (see FIG. 4B). More specifically, in this example: (i) the URL was changed from www.vehiclesales.biz/purchase to www.vehiclesales.biz/buy for greater end user convenience; and (ii) the content and metadata of web page 400 is not otherwise changed (compare FIG. 4A to FIG. 4B). The result of this change in URL of web page 400 is that: (i) the link in first version of second web page 402a is broken (see FIG. 4C) and needs updating; and (ii) the link in first version of third web page 404a is broken (see FIG. 4D) and needs updating.

Processing proceeds to operation S285, where update links mod 330 determines that the two broken links have been broken and need updating. In some embodiments, the mapping table may be consulted to help identify links in need of an update. This may be discussed further in the following sub-section of this Detailed Description section.

Processing proceeds to operation S290, where update links mod 330 fixes the broken links using mapping table 1000. As shown in web page 402b of FIG. 4E and web page 404b of FIG. 4F, update links mod 330 has fixed the broken links from web pages 402a and 404a (compare FIGS. 4E and 4F to FIGS. 4C and 4D, where the linked to link ("Click Here") now reflects the correct URL (www.vehiclesales.biz/buy)). This may be discussed further in the following sub-section of this Detailed Description section.

III. Further Comments and/or Embodiments

Some embodiments of the present invention recognize one, or more, of the following facts, potential problems and/or potential areas for improvement with respect to the current state of the art: (i) it is sometimes desirable to move artifacts from one server to another; (ii) in some cases, based on the implementation of the server and internal constructs, this is not easy, recommended, or supported (one example of this is QM (Quality Management); (iii) in some cases it is difficult or impossible to move artifacts (such as test cases, test plans, defects, requirements, etc.) from one project area to another while ensuring the existing items/links/artifacts referenced within the richtext portions of the moved artifacts stay intact and are still valid; (iv) in QM, once project area contents are copied to a new project area, the internal artifact IDs are changed, so that any references in the richtext portion of one artifact to another must be manually updated to resolve the new project area location as well as any ID changes; (v) it takes a lot of time to check and manually update these links, and the problem is made worse by versioning (that is, having multiple versions of artifacts and possible version targets of the same named artifact); (vi) what is needed is a way to automate the process of finding or listing broken embedded links and a method to update them in order to eliminate undergoing the tedious manual process; and/or (vii) if auto update is not possible or desired, a method to provide a suggested update when the link is encountered, along with an estimate of correctness for the suggested fix, should be developed.

Some embodiments of the present invention may include one, or more, of the following features, characteristics and/or advantages: (i) fixes broken links during server migration and associated update of a servable dataset (for example, a cloud-based application, a traditional website); (ii) solves one of the problems that complicates moving a project area from one server to another (that is, links losing their references); (iii) uses knowledge of what is being copied along with the primary asset to fix related links and providing an incremental way to fix external embedded link in related artifacts and/or (iv) tracks what other artifacts had the original fix and who/authority associated with the original fix.

Some embodiments of the present invention may include one, or more, of the following features, characteristics and/or advantages: (i) proposes a system that parses richtext areas and places links found into mapping table; (ii) uses the mapping table to automatically update/replace links wherever they are found in related system artifacts; (iii) suggests possible target links for manual inspection/updates based on the likelihood of correctness, artifact types, and user roles (assuming that the resolution cannot be automatically determined); and/or (iv) improves upon manually updating links without any context.

An example method of placing links in a mapping table for purposes of maintaining data integrity during migration of a project area from one server to another (according to an aspect of the present invention) includes the following operations: (i) adding all links contained within richtext portion of the primary artifact to a mapping table when a deep copy is performed for a test plan (primary artifact), or other artifacts that include embedded links, all are added; (ii) performing a deep copy for another artifact (as used herein, a "deep copy" refers to a copying process that is sufficiently robust such that all artifacts contained within and/or associated with the deep copied artifact are copied); (iii) recording, in the mapping table, all copied artifacts that are copied as part of the deep copy process; and (iv) associating the information of the copied artifacts at the time of performing the previous operation.

In this embodiment, the mapping table has the following features and/or information: (i) mapping table has "copied from:" and "copied to:" fields for each entry; (ii) "copied from:" contains all embedded links retrieved from richtext portions of copied artifacts; (ii) "copied to:" contains location of other secondary copied artifacts; and (iii) at the end of a deep copy operation, any embedded richtext links are fixed with known information (represented by both copied from and copied to rows are complete) in the mapping table.

In this paragraph, links that cannot be fixed (represented by any links with no "copied to:" table entries) will be discussed. When any of the artifacts are changed and/or manually corrected, the mapping table is updated with the "copied to:" information. When this change is made by a user/admin preference, the following scenarios can be observed: (i) when someone (such as a user) opens a different artifact that has the same link that had already been manually repaired, the user is given the option to preview the new link and update or reject the new target; (ii) periodically, the system runs a background process and reports all artifacts that required fixing (such as artifacts that have same "copied from:" but at least one has a different "copy to:" now) and the report is sent to an administrator or artifact owner (however, alternatively, the links can be updated automatically); (iii) where there is the same "copied from:" and many "copied to:" a set of rules can determine what is chosen (for example, artifact type (Test plan beat Test cases, or the latest version is likely to be more accurate than older versions, etc.)); (iv) authority or group membership for the person that made the change could also be used to infer accuracy (for instance, by role, where the team lead assumed the change made was more accurate than the tester/developer); and/or (v) a combination of frequency (number of fixes) and other factors (mentioned above) can be used to estimate which link fix is the best to "accept."

An example of a use case embodiment of the present invention, called "RichText From Testplan—PlanABC," will now be discussed with reference to FIGS. 5 to 7. In this embodiment the QM is implemented specifically as RQM (rational quality manager). In this PlanABC use case: (i) an RQM Testplan (PlanABC) contains associated RQM Testcases; (ii) all the artifacts RQM Testplan and Testcases have links embedded within their respective richtext areas; (iii) the RQM Testplan(PlanABC) is copied (to a new location) using a Deep Copy (meaning that the testplan and all associated referenced items (such as testcases) are copied); and (iv) as shown in mapping table 500 of FIG. 5, before the copy of the richtext portion, the Testplan includes a richtext link to testcase (J2CMBDManualSetup) and to an external reference (MDBReleaseNotes).

A method associated with the PlanABC embodiment includes the following operations: (i) click "Edit Operations"; (ii) add a description to the operation, but keep the default name; (iii) finish on the J2C Bean and Deployment Wizard; (iv) at this point, all the artifacts should be created (such as MBD, Session Bean, Schema files needed by WBM, etc.), and in the case they are not, review the detailed steps found in testcase; (v) make sure they have all been created in the project and that no errors appear; and (vi) in the case that errors exist in the M DB, do a CLEAN (see list of issues—MDBReleaseNotes) and re-run the foregoing steps.

Mapping Table (above) depicts a scenario where Deep Copy and autofix is complete and the link to testcase J2CMDBManualSetup is fixed to the correct location.

A second example of a use case for embodiments of the present invention, with respect to "RichText From Testplan—PlanABC" will now be discussed. This use case requires at least the following operations: (i) click "Edit Operations"; (ii) add a description to the operation, but keep the default name; (iii) finish on the J2C Bean and Deployment Wizard; (iv) at this point, all the artifacts should be created (such as MBD, Session Bean, Schema files needed by WBM, etc.), and in the case they are not, the detailed steps found in testcase J2CMDBManualSetup should be reviewed; and (v) after a single manual fixup/update for the same link (MDBReleaseNotes) in another artifact within the system occurs, the mapping table gets updated with a new location for "copied to:" (as shown in mapping table 600 of FIG. 6).

As shown in screenshot 700 of FIG. 7, when the testcase is opened, the editor gets an opportunity to update the link within the current testcase in this embodiment. The system can be implemented such that a degree of accuracy is considered before update is suggested. For instance: (i) the same fix can be recently made by the same person or someone with an admin or elevated group authority or a higher access role made the original change; (ii) the same change was made for a Testplan related to the testcase; and/or (iii) the number of fixes made by others to the same link. In another embodiment of the present invention, based on the degree of accuracy for the link update, manual fixes (such as periodic new entries in the mapping table) could be propagated automatically throughout the system.

In the following paragraphs, additional details with respect to the migration use case and its implementations will now be discussed. After a server migration, CLM (collaborative lifecycle management) artifacts with richtext fields would be scanned for links, and this process includes at least the following steps: (i) server migration completes and linked artifact relationships are updated during the migration; (ii) successful migration initiates a process to scan CLM artifacts richtext fields; (iii) as part of the CLM deep copy process, a deep scan could be performed on the artifacts contained richtext fields to preliminarily define links for a mapping table; and (iv) links found are placed in mapping table. In this embodiment, links are not updated as part of the CLM migration processes, but require manual intervention by the following potential scenarios.

These potential scenarios include: (i) admin updates to the mapping table directly; (ii) user is prompted to update richtext link when artifact is opened; (iii) prompt appears as a popup fix dialog over the existing richtext link; (iv) automatic background process updates links that match manually updated links found in other artifacts; (v) a confidence check is used when the same link is updated in different artifact by different users, with preference given to the update done by the user with the highest role/authority; and/or (vi) admin/lead initiates process to propagate link updates found/validated to additional artifact richtext fields with the same link.

As part of the migration scenario, certain artifacts might be migrated from one type/version to another. When these artifacts are linked within a richtext field, the new link may not be obvious (for instance, it might be necessary to change more than just a hostname in the URL). This may be done in order to resolve the process of building a mapping table that could extract the types of artifacts contained at the link target. The migration process could expose artifact type migration to be included in the mapping table to assist in the richtext link updates (for instance "http://server.com/com.ibm.rqm.testcase/11," might be "http://server.com/com.ibm-.rqm.testscript/11" in the migrated version. The migration could also expose version numbers hard coded into links that may need updating for future test executions (for instance: http://jarlibrary.com/jars/com.ibm.myjar.v1 or http://product.documentation.com/docs/v1/help.html).

Table 800 of FIG. 8 is representative of the mapping table created during the richtext field migration process. Table 900 of FIG. 9 is representative of the mapping table as updates are made to testcase richtext fields as part of migration completion, which shows the new locations of links found in richtext fields. Instances found and/or instances updated reflects the confidence check that applies to automatic updating of richtext field links. Because individuals in Test Lead and Admin roles changed some links, those links were automatically updated. The link changed by the user with the Tester role did not meet the confidence check to automatically update all links found during migration.

Some examples of link descriptions include: (i) Test Case links contained in richtext fields are linked via a static link, this needs to be updated after a server migration; (ii) Test Plan links contained in richtext fields are linked via a static link, this needs to be updated after a server migration; (iii) Requirement links contained in richtext fields are linked via a static link, this needs to be updated after a server migration; (iv) Defect links contained in richtext fields are linked via a static link, this needs to be updated after a server migration; and/or (v) Test Script links contained in richtext fields are linked via a static link, this needs to be updated after a server migration.

In the following paragraph, edge cases that embodiments of the present invention would handle will be discussed. In the first edge case, the system would handle Partial migration of a distributed CLM system (that is, only the Requirements server is migrated). The system would allow the update link mapping table run for only richtext fields on the associated non-Requirement server (RTC and RQM only). In the second edge case, the system would handle addition of a load balancing proxy installed in front of a distributed CLM system. The system would allow the update link mapping table run for all artifacts on the system even if the actual CLM system was not migrated; links in the richtext fields would still need to change.

Some embodiments of the present invention may include one, or more, of the following features, characteristics and/or advantages: (i) relates to links external to the system; (ii) focuses on server internal links that are not migrated during a standard migration process; and/or (iii) makes better choices of what link is more accurate based on a parent/child relationship and also roles of person making the change.

For example, with respect to a parent/child relationship, testplan encapsulates testcase and changes a link to testcase1 within testplan X, and this change is considered a better choice if the same testcase1 is seen within testplan Y. Therefore, if someone changes testcase1 to a new link value within another referenced document that has less weight (such as problem-report A), references testcase changes the link to testcase1 from problem-report A, and someone else has changed testcase1 link within testplan X when the link is seen in testplan Y, the person gets two choices: (a) change from testcase1 target from problem-report A, and/or (b) change testcase1 target from testplan X. Some embodiments of the present invention will show both choices, but will suggest that: (i) since testplan and testcases are more closely related with respect to the parent child relationship, and (ii) suggest that "testcase1 link target as seen in testplan X" is the better choice and is more likely to be correct. The same choices will be made if a user assistance agent (UA) changes a testcase link rather than a developer. In this example, the user assistance agent is the person that writes product documentation.

Embodiments of the present invention relating to documents owned by a UA group will now be discussed. With respect to a document owned by the UA group, the UA person's change is more likely to be deemed the best choice. This introduces the notion that the document has metadata that explains/discloses the document's likely owners, as well as which kinds of owners are most equipped to know what is right for people, and therefore people from that UA group (in that role) are thought to be "more" right. This can be extended to mean that the team lead and manager are better judges of what is right, versus a cooperative.

Some embodiments of the present invention may include one, or more, of the following features, characteristics and/or advantages: (i) teaches a method to infer correctness of the choices and fixes to broken links using roles and the notion of what is "more" right; (ii) enables links to remain active/valid during a server migration scenario; and/or (iii) uses a mapping system to enable the system to detect/fix the links, where the mapping table is used as a way to fix links and not to enable a wider communication network.

Some embodiments of the present invention may include one, or more, of the following features, characteristics and/or advantages: (i) focuses on embedded links that require updates from the old to new system; (ii) involves links that are likely not broken; (iii) provides a mechanism to update links embedded in a richtext field to point to their new location on the new server, using an intelligent feedback loop to suggest link updates where the old link has already been updated by another user on the system; (iv) uses a method to identify links that need to be updated as part of a server migration; (v) creates a table of links embedded in special sections of server artifacts for the purpose of identifying and updating to a new link that is valid in the new/migrated server configuration; and/or (vi) has a confidence/intelligent link update selection that will, dependent on a confidence check based on who has proposed the link change, update links automatically.

Some embodiments of the present invention may include one, or more, of the following features, characteristics and/or advantages: (i) proposes a way to fix links that are not broken and/or do not throw an error; (ii) helps with server migration where links within and between migrated artifacts require updates; (iii) uses knowledge of what is being copied along with the primary asset to fix related links and providing an incremental way to fix external embedded link in related artifacts; (iv) tracks what other artifacts had the original fix and who and/or what authority is associated with the original fix; (v) focuses on the migration scenario where valid links need to be updated to point from an old to a new link location; (vi) takes the process of updating embedded links a step further by allowing a set of users to collaboratively contribute towards the updating of embedded links; and/or (vii) uses the collaborative link update mechanism to automatically update all additional embedded link references, intelligently choosing the best link update based on the role of the user proposing the update.

Some embodiments of the present invention may include one, or more, of the following features, advantages, characteristics and/or operations: (i) updates embedded links that are not broken or need to be updated during a server migration; (ii) solves a problem presented where a server migration is underway and the old server is still running and links are still active; (iii) provides a solution for updating links/suggesting links with varying degrees of confidence that point to out dated references; and/or (iv) provides a solution for updating links/suggesting links that are updated by members of a team with differing roles using a feedback loop.

There will now be discussion of how a mapping table can help identify links for updating, especially when the link is not a broken link, will be discussed in the following paragraphs.

A mapping table (or similar) is helpful when links needing to be updated cannot all be identified automatically. Some links could be identified automatically—like when a hostname gets changed from serverA to serverB. During a server migration, data migration, or acceptance testing of a new server environment links may be manually updated. They may be manually updated by different users, with different roles/permissions. Manually link updates done in a richtext field could be added to a mapping table, along with information about who updated the link. Because the same link may exist in multiple migrated artifacts, the mapping table built during data acceptance, could be used to determine how links in other artifacts could be updated similarly— using a confidence factor calculated by seeing who and with what role the link had previously corrected the link in the embedded field. Updates with higher permissions/roles could be given precedence when suggesting link updates, lower link update suggestions could be discarded/ignored by the system. This method would allow for "live" links in a deep copy field get updated on a migration scenario.

When the server hostname is changed, the process of server rename adds the old-server new-server pair to the link mapping table. Whenever a link lookup function is performed, the beginning portion of the URL up to the initial slash (past the double slash) is searched for in the FROM column entries of the mapping table and if found is replaced by the TO column entry. The link request is then send out for resolution over the network.

In the case of a deep asset copy to a new server, these links to related assets are identified as the time of the asset copy through scanning of text fields. If the old server name is found, it should be replaced by the new server name. Because of the expensive nature of this operation, the links are left as is, a server mapping table entry is added for the old-server to new-server mapping so that any requested link referencing the old server is translated to reference the new server.

It is possible that some old-server references could indeed be valid. Especially if a related asset is in fact still hosted on the old-server. In this case, we would need to add a leading meta-character such as "!" to the URL to make the lookup function skip the mapping table lookup. In the event that the reference was later broken by moving the link's target, the asset's user could remove the meta-character and permit the link to be translated to its new target destination.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
receiving, in connection with a server migration, a deep copy request to make a deep copy of a first web page identified by a first uniform resource locator (URL) from a source server to a target server;
responsive to receipt of the deep copy request, making a deep copy of the first web page, with the making of the deep copy including:
identifying a second web page identified by a second URL that links to the first web page,
copying, from the source server to the target server the first web page identified by the first URL to a third web page identified by a third URL,
copying, from the source server to the target server, the second web page identified by the second URL to a fourth web page identified by a fourth URL, and
creating a mapping table data structure including a first record, with the first record including at least: (i) a field for the third URL corresponding to the third web page, (ii) a field for the fourth URL corresponding to the fourth web page, and (iii) a date when the making of the deep copy is performed; and
correcting a broken link in the fourth web page to link to the third URL based on the first record in the mapping table data structure.

2. The computer-implemented method of claim 1 wherein the mapping table includes a field identifying the source server.

3. The computer-implemented method of claim 1 wherein the mapping table includes a field identifying the target server.

4. The computer-implemented method of claim 1 wherein the mapping table includes a field identifying a requestor of the deep copy.

5. The computer-implemented method of claim 1 wherein:
the mapping table includes a field indicating an identity of a person who made a manual update of the respectively corresponding link; and
the mapping table includes a field indicating the role of the person who made the manual update of the respectively corresponding link.

6. A computer program product comprising:
a computer readable storage medium; and
computer code stored on the computer readable storage medium, with the computer code including instructions and data for causing a processor(s) set to perform operations including the following:
receiving, in connection with a server migration, a deep copy request to make a deep copy of a first web page identified by a first uniform resource locator (URL) from a source server to a target server;
responsive to receipt of the deep copy request, making a deep copy of the first web page, with the making of the deep copy including:
identifying a second web page identified by a second URL that links to the first web page,
copying, from the source server to the target server, the first web page identified by the first URL to a third web page identified by a third URL,
copying, from the source server to the target server, the second web page identified by the second URL to a fourth web page identified by a fourth URL, and
creating a mapping table data structure including a first record, with the first record including at least: (i) a field for the third URL corresponding to the third web page, (ii) a field for the fourth URL corresponding to the fourth web page, and (iii) a date when the making of the deep copy is performed; and
correcting a broken link in the fourth web page to link to the third URL based on the first record in the mapping table data structure.

7. The product of claim 6 wherein the mapping table includes a field identifying the source server.

8. The product of claim 6 wherein the mapping table includes a field identifying the target server.

9. The product of claim 6 wherein the mapping table includes a field identifying a requestor of the deep copy.

10. The product of claim 6 wherein:
the mapping table includes a field indicating an identity of a person who made a manual update of the respectively corresponding link; and
the mapping table includes a field indicating the role of the person who made the manual update of the respectively corresponding link.

11. A computer system comprising:
a processor(s) set;
a machine readable storage device; and
computer code stored on the machine readable storage device, with the computer code including instructions and data for causing the processor(s) set to perform operations including the following:
receiving, in connection with a server migration, a deep copy request to make a deep copy of a first web page identified by a first uniform resource locator (URL) from a source server to a target server;
responsive to receipt of the deep copy request, making a deep copy of the first web page, with the making of the deep copy including:
identifying a second web page identified by a second URL that links to the first web page,
copying, from the source server to the target server, the first web page identified by the first URL to a third web page identified by a third URL,
copying, from the source server to the target server, the second web page identified by the second URL to a fourth web page identified by a fourth URL, and
creating a mapping table data structure, including a first record, with the first record including at least: (i) a field for the third URL corresponding to the third web page, (ii) a field for the fourth URL corresponding to the fourth web page, and (iii) a date when the making of the deep copy is performed; and
correcting a broken link in the fourth web page to link to the third URL based on the first record in the mapping table data structure.

12. The system of claim 11 wherein the mapping table includes a field identifying the source server.

13. The system of claim 11 wherein the mapping table includes a field identifying the target server.

14. The system of claim 11 wherein the mapping table includes a field identifying a requestor of the deep copy.

15. The system of claim 11 wherein:
the mapping table includes a field indicating an identity of a person who made a manual update of the respectively corresponding link; and
the mapping table includes a field indicating the role of the person who made the manual update of the respectively corresponding link.

* * * * *